US012397913B2

(12) United States Patent
Meyer et al.

(10) Patent No.: US 12,397,913 B2
(45) Date of Patent: Aug. 26, 2025

(54) AIRCRAFT SECTION AND AIRCRAFT HAVING A MONUMENT WITH TWO LAVATORIES

(71) Applicant: Airbus Operations GmbH, Hamburg (DE)

(72) Inventors: Michael Meyer, Hamburg (DE); Thomas Canton, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/423,651

(22) Filed: Jan. 26, 2024

(65) Prior Publication Data

US 2024/0253784 A1    Aug. 1, 2024

(30) Foreign Application Priority Data

Jan. 30, 2023    (EP) ..................................... 23153970

(51) Int. Cl.
   *B64D 11/02*    (2006.01)
   *B64D 11/04*    (2006.01)

(52) U.S. Cl.
   CPC .............. *B64D 11/02* (2013.01); *B64D 11/04* (2013.01)

(58) Field of Classification Search
   CPC ..... B64D 11/02; B64D 11/04; B64D 11/0023; B64D 45/0015; B64D 45/0018; B64D 45/0021; B64D 45/0026; B64D 45/0028; B64C 1/1469
   See application file for complete search history.

(56) References Cited

U.S. PATENT DOCUMENTS

| 10,577,074 | B2  | 3/2020 | King |
| 2003/0066931 | A1* | 4/2003 | Ward ..................... B64D 11/04 244/118.5 |
| 2003/0071743 | A1  | 4/2003 | Seah et al. |
| 2003/0080249 | A1  | 5/2003 | Raczkowski |
| 2004/0163170 | A1  | 8/2004 | Cooper et al. |

(Continued)

FOREIGN PATENT DOCUMENTS

| EP | 4011781 A1 | 6/2022 |
| WO | 03047973 A1 | 6/2003 |

OTHER PUBLICATIONS

European Search Report for corresponding European Patent Application No. 23153970 dated Jun. 23, 2023.

*Primary Examiner* — Arfan Y. Sinaki
(74) *Attorney, Agent, or Firm* — Greer, Burns & Crain, Ltd.

(57) ABSTRACT

An aircraft section, between a cockpit and a cabin, comprises an aisle to access to the cockpit from the cabin, and a monument extending in a longitudinal direction and a transverse direction. The monument includes a first lavatory, a second lavatory adjacent thereto in the transverse direction and comprising the aisle, a wall separating the first lavatory from the second lavatory, a boundary wall delimiting the first lavatory and a portion of a rear wall of the cockpit, and a second boundary wall delimiting the second lavatory and a second portion of the rear wall of the cockpit. The boundary walls are parallel or continuous. The monument further includes an outer door movable between an open position, where the cockpit aisle is accessible from the cabin area, and a closed position, where the cockpit aisle is blocked with respect to the cabin area.

19 Claims, 7 Drawing Sheets

(56) References Cited

U.S. PATENT DOCUMENTS

| | | | |
|---|---|---|---|
| 2018/0334237 A1* | 11/2018 | King | B64D 45/0026 |
| 2019/0248495 A1* | 8/2019 | Seibt | B64D 11/02 |
| 2019/0300140 A1 | 10/2019 | Guering et al. | |
| 2020/0108907 A1* | 4/2020 | Movsesian | B64D 45/0026 |
| 2020/0115029 A1 | 4/2020 | Movsesian et al. | |
| 2020/0130842 A1 | 4/2020 | Young et al. | |
| 2022/0177110 A1 | 6/2022 | Mathieu et al. | |
| 2024/0124118 A1* | 4/2024 | Movsesian | B64C 1/1461 |

* cited by examiner

AIRCRAFT SECTION AND AIRCRAFT HAVING A MONUMENT WITH TWO LAVATORIES

CROSS-REFERENCES TO RELATED APPLICATIONS

This application claims the benefit of European Patent Application No. 23153970.1 filed on Jan. 30, 2023, the entire disclosure of which is incorporated herein by way of reference.

FIELD OF THE INVENTION

The present disclosure generally relates to an aircraft section and associated aircraft having a monument with two lavatories. Particularly the present disclosure relates to an aircraft section and associated aircraft having a monument with two lavatories, one of which is adjacent to a cockpit aisle, and the cockpit aisle can be closed from a cabin area by a door.

BACKGROUND OF THE INVENTION

Currently, a monument including a lavatory is installed in proximity to the cockpit of an aircraft. For instance, the monument can be installed between a door of the aircraft (allowing people to enter and leave the aircraft) and the cockpit, so that the space on the other side of the door (rearwards in the aircraft) can efficiently be used for passenger seating. This also allows a pilot to use the lavatory, as it is close to the cockpit.

The security of the cockpit needs continuous improvement, particularly the accessibility of the cockpit by non-authorized people has to be avoided. A pilot who wants to use a lavatory, however, has to open a cockpit door, thereby significantly increasing the risk of an intruder entering the cockpit. In order to avoid such situations, a dedicated pilot lavatory was evaluated and developed, which was solely accessible from the cockpit. For instance, the lavatory installed between the door of the aircraft and the cockpit was designed without a door to the cabin area of the aircraft, but only with a door into the cockpit. Thus, the pilots were able to use a lavatory, without opening the cockpit door to the cabin area.

In order to provide a lavatory for passengers, another passenger lavatory has to be installed in such an aircraft, for instance on the other side of the aircraft door.

However, this requires space usually used for passenger seating, so that the aircraft loses passenger seats and, hence, revenue for the aircraft operator.

SUMMARY OF THE INVENTION

It is therefore an object of the present disclosure to provide a more efficient and space-saving manner for providing a dedicated pilot lavatory.

This object may be solved by the present invention as described in one or more embodiments herein. Preferred embodiments are also described.

According to a first aspect to better understand the present disclosure, an aircraft section arranged between a cockpit and a cabin area of an aircraft comprises a cockpit aisle configured to allow access to the cockpit from the cabin area, and a monument. In the present disclosure the cockpit area is considered to be arranged on the same level (or floor) as the cabin area, and is further considered to form the front or nose portion of the aircraft on this level. The cockpit aisle extends between the cabin area and the cockpit, and allows a person passing the monument when walking along the aisle from the cabin area to the cockpit and vice versa.

The monument extends in a longitudinal direction (X-axis) and a transverse direction (Y-axis; orthogonal to the longitudinal direction) of the aircraft, i.e., has a two-dimensional footprint in the X- and Y-axis directions. It is to be understood that the footprint of the monument does not need to be rectangular, but can have any shape. The monument includes a first lavatory, a second lavatory arranged adjacent to the first lavatory in the transverse direction (Y-axis) and comprises the cockpit aisle. In other words, the cockpit aisle forms at least a portion of the second lavatory. As a mere example, a footprint of the cockpit aisle can be entirely comprised in a footprint of the second lavatory. Alternatively, the footprint of the cockpit aisle can likewise overlap with at least a portion of the footprint of the second lavatory, and/or the footprint of the second lavatory can overlap with at least a portion of the footprint of the cockpit aisle.

The monument further comprises a first separation wall separating the first lavatory from the second lavatory. In other words, the monument is designed to provide two lavatories next to one another (in the transverse direction) and separated by the first separation wall. Since the second lavatory comprises the cockpit aisle, the second lavatory is arranged between the cabin area and the cockpit. For instance, when viewing in the transverse direction (Y-axis), the first lavatory follows the second lavatory. As a mere example, the first lavatory can be adjacent to the primary structure of the aircraft, such as close to the outer skin of the aircraft.

This allows a space-saving arrangement of two lavatories when viewing in a longitudinal direction of the aircraft (X-axis). Specifically, there is no necessity to install a second lavatory in a space of the aircraft that could be used for passenger seats or other components in the passenger cabin valuable for the aircraft operator. In addition, the cockpit aisle is still available, so that usual access to the cockpit is possible.

Furthermore, the monument includes a first boundary wall delimiting the first lavatory and a first portion of a rear of the cockpit, and a second boundary wall delimiting the second lavatory and a second portion of a rear of the cockpit. In other words, the first and second boundary walls form a rear wall of the cockpit or at least portions of such a rear wall of the cockpit or at least portions of different sections of the rear of the cockpit (e.g., on a respective side of the cockpit aisle). The first and second boundary walls form a continuous wall or are parallel to one another. As a mere example, parallel first and second boundary walls can have a step therebetween. For instance, the step can correspond to a portion of the separation wall between both lavatories.

Delimiting or forming a first/second portion of a rear of the cockpit can include that the first/second boundary wall forms a respective portion of a rear wall of the cockpit. Alternatively, the first/second boundary wall can respectively be arranged adjacent to a portion of a rear wall of the cockpit, such wall being a separate wall or bulkhead in the aircraft.

The monument also includes an outer door movable between an open position, where the cockpit aisle is accessible from the cabin area, and a closed position, where the cockpit aisle is blocked with respect to the cabin area. This allows using the cockpit aisle for entering or leaving the cockpit as usual. Once the outer door is in the closed position, a separation between the cabin area and the cockpit aisle and, hence, the cockpit is achieved, which fulfils the required security measures to prevent any intruders from entering the cockpit. On the other hand, the area of the cockpit aisle is still available for the pilot. Since the cockpit aisle is at least partially comprised in the second lavatory, the (footprint) area of the cockpit aisle, or at least a portion thereof, can be used as a lavatory area, when the outer door is in the closed position.

Thus, the space of the cockpit aisle can efficiently be used as an aisle, when the second lavatory is not required, and as a dedicated pilot lavatory space, when the aisle is not required (such as when the pilot controls the aircraft in the cockpit). Moreover, a portion of the second lavatory, such as the portion comprising a fixed installation (e.g., a toilet bowl, sink, etc.), can be designed smaller than a usual lavatory, particularly the necessary and fixed installations of the second lavatory can be placed in a small, dedicated area, which leaves the area for the cockpit aisle free of any installations and devices.

In an implementation variant, the outer door can be mounted to the second lavatory and can be configured to separate at least one fixed installation of the second lavatory from the cockpit aisle, when the outer door is in the open position. It is to be understood that mounted to the second lavatory means that the door is mechanically coupled to a structure that forms at least a portion of the second lavatory. Furthermore, the outer door closes or hides the space of the second lavatory holding the at least one fixed installation, when the second lavatory is not in use. Particularly, this space holds some or all necessary installations and devices of the second lavatory, and can be hidden by the outer door. The outer door in the open position, hence, can form a portion of a sidewall of the cockpit aisle.

In another implementation variant, the monument can further include a curtain separating the second lavatory installation(s) from the cockpit aisle. Such a curtain, when in a closed position, may span the entire length of the cockpit aisle, so that any installations and devices of the second lavatory are hidden behind the curtain.

In yet another implementation variant, the monument can further include at least one inner door movable between an open position, where the cockpit aisle is accessible from the cockpit, and a closed position, where the cockpit aisle is blocked with respect to the cockpit. This allows closing the second lavatory when in use also with respect to the cockpit, so that the privacy for the user of the second lavatory is achieved.

In addition, such inner door together with the outer door can form a secondary barrier, further preventing or at least hindering any intruder from entering the cockpit.

In a further implementation variant, the at least one inner door can be mounted to the second lavatory and can be configured to separate at least one fixed installation of the second lavatory from the cockpit aisle, when the at least one inner door is in the open position. It is to be understood that mounted to the second lavatory means that the door is mechanically coupled to a structure that forms at least a portion of the second lavatory. Furthermore, the at least one inner door closes or hides the space of the second lavatory holding the at least one fixed installation(s), when the second lavatory is not in use. Particularly, this space can hold some or all necessary installations and devices of the second lavatory, and can be hidden by the at least one inner door. The inner door in the open position, hence, can form a portion of the sidewall of the cockpit aisle.

In yet a further implementation variant, the at least one inner door can comprise a first inner door mounted to the second lavatory and configured to separate the at least one fixed installation of the second lavatory from the cockpit aisle, when the first inner door is in the open position, and a second inner door mounted at a position opposite to the first inner door with respect to the cockpit aisle. This double door allows sizing the first and/or second inner door in any required manner.

As a mere example, the first inner door may have or form a door leaf having a width that closes a portion of the space holding the at least one fixed installation of the second lavatory that is not closed/hidden by the outer door, if the first inner door and the outer door are in their respective open positions.

In another implementation variant, the second inner door can be mounted to a wall delimiting a further monument arranged adjacent to the second lavatory in the transverse direction. The further monument, hence, delimits the second lavatory comprising the cockpit aisle (when viewing in the transverse/cross direction of the aircraft).

As a mere example, the outer door (as well as the first inner door), when in the open position, can delimit the cockpit aisle on one side, while the wall delimiting the further monument can delimit the cockpit aisle on the other (opposite) side, so that the outer door (and first inner door) in the open position and the wall of the further monument define the width of the cockpit aisle.

Alternatively, the outer door (as well as the first inner door), when in the open position, can delimit the cockpit aisle on one side, while the first separation wall can delimit the cockpit aisle on the other (opposite) side, so that the outer door (and first inner door) in the open position and the first separation wall define the width of the cockpit aisle.

In the latter case, the second inner door can likewise be mounted to the first boundary wall and/or the first separation wall.

The further monument can be a galley for storing and preparing food and drinks for passengers as well as for performing usual tasks of a cabin attendant.

Alternatively, the further monument can be another lavatory corresponding to the first lavatory. This allows the provision of two lavatories for passengers, while the second lavatory can be accessed from the cockpit, particularly when the outer door is in the closed position.

As a mere example, the monument and the further monument may be designed in a symmetric manner with a center longitudinal axis of the aircraft as an axis of symmetry (i.e., when viewing in the longitudinal direction of the aircraft). This symmetry may particularly pertain the walls of the monument and the further monument.

In addition, the outer door and/or the at least one inner door may be symmetric in view of the entire structure including the monument and the further monument. As a mere example, the outer door may comprise two door leaves mounted on opposite sides and being arranged in a common plane when both door leaves are in the closed position.

In yet another implementation variant, the at least one inner door can be mounted to the outer door. In other words, the at least one inner door forms an extension of the door leaf of the outer door. As a mere example, a door leaf of the at least one inner door may be hinged to a free end of a door leaf of the outer door.

In an implementation variant, the monument can further include a third boundary wall delimiting the second lavatory and a remainder of the aircraft section. For instance, the third boundary wall can be arranged on a side of the second lavatory forming a transverse end of the monument opposite to the first lavatory. This allows installing the monument in the aircraft, for example pre-assembled, while both lavatories and the cockpit aisle are already defined and set by the installed monument.

Alternatively or additionally, the monument can further include a cockpit aisle floor forming the cockpit aisle and mounted or connected to the second lavatory and/or the first lavatory. This also allows installing, at least partially, a structure that forms the cockpit aisle in the aircraft, when the monument is installed in the aircraft. As a mere example, the first separation wall and/or the third boundary wall can be mounted to the cockpit aisle floor, particularly at a bottom end of the respective boundary wall.

Also alternatively or additionally, the monument can further include a cockpit aisle ceiling covering the cockpit aisle and mounted or connected to the second lavatory. Likewise, this allows installing, at least partially, a structure that forms the cockpit aisle in the aircraft, when the monument is installed in the aircraft. As a mere example, the first separation wall and/or the third boundary wall can be mounted to the cockpit aisle ceiling, particularly at a top end of the respective boundary wall.

In another implementation variant, the third boundary wall can delimit a galley of the aircraft arranged adjacent to the second lavatory in the transverse direction (Y-axis). Usually a galley is provided at the front end of the cabin area, i.e., on a rear side of the cockpit. The monument including the third boundary wall can thus provide a delimiting wall for the galley, or even form part of the structure of the galley. This facilitates installation of the galley as well as installation of the first and second lavatory including the cockpit aisle. It is to be understood that instead of a galley the third boundary wall can also delimit to any other kind of monument, such as a third lavatory, a cabinet, a separating wall or the like.

In yet another implementation variant, the space of the second lavatory holding any fixed installation(s), when viewing in a longitudinal direction of the aircraft and when the outer door is in the open position, can have a width substantially (i.e., +/−10%) corresponding to a width of a trolley parking space. The size of a trolley is standardized, e.g., the majority of trolleys has a width of 30.5 cm. Accordingly, a trolley parking space is also standardized, as it is only slightly wider than the width of a standardized trolley. As a mere example, the width of a trolley parking space, and hence, the width of the space of the second lavatory holding any fixed installation(s) is between 31 and 40 cm, and preferably between 32 and 35 cm.

In a further implementation variant, the first lavatory can comprise at least a sink and a toilet, and the fixed installation of the second lavatory can comprise at least a sink and a toilet. A sink and a toilet can be the necessary and fixed installations of the respective lavatory. Further examples of such (fixed) installations can be a faucet, a paper towel dispenser, a mirror, etc.

In yet a further implementation variant, the monument can further comprise a lavatory door allowing access from the cabin area into the first lavatory. This lavatory door can be any usual lavatory door for a passenger lavatory.

In another implementation variant, the monument can further comprise a fourth boundary wall delimiting the first lavatory and the cabin area. The lavatory door can be installed in the fourth boundary wall. As a mere example, the fourth boundary wall can be arranged at a position in the longitudinal direction (X-axis) spaced apart from a position in the longitudinal direction of the outer door in the closed position. In other words, the outer door in the closed position is arranged closer to the cockpit than the fourth boundary wall. This allows increasing the footprint area of the first lavatory, for example, to provide a lavatory for people with reduced mobility and/or for a higher-class cabin (e.g. business class or first class).

In yet another implementation variant, the lavatory door can comprise a first lavatory door mounted to the fourth boundary wall and a second lavatory door mounted to the first separation of wall, wherein the first and second lavatory doors in a respective closed position are arranged at an angle smaller than 180° with respect to one another. In other words, the first and second lavatory doors in a respective closed position form a corner of the first lavatory footprint with respect to the fourth boundary wall and the first separation wall. Such lavatory door allows a larger door opening and, hence, facilitates accessibility of the first lavatory, for example, for people with reduced mobility.

In an implementation variant, at least the first separation wall, the first boundary wall, and the outer door can be made of a bullet-proof material. Usually, a rear wall of a cockpit or a boundary wall of a monument forming such a rear wall is made of a bullet-proof material, in order to protect the pilots and the equipment installed in the cockpit. By forming the first separation wall and the outer door of a bullet-proof material, the space defined by the second lavatory is likewise protected.

In another implementation variant, the monument can further include a fifth boundary wall delimiting the second lavatory and the cabin area. For instance, the fifth boundary wall may be arranged between the first lavatory and the cockpit aisle as well as adjacent to the cabin area, or between the cockpit aisle and the third boundary wall. As with other walls and structures, the fifth boundary wall can be made of a bullet-proof material.

It is to be understood that further structures and walls can be made of a bullet-proof material. For instance, the third boundary wall and/or the at least one inner door can be made of a bullet-proof material for protecting the space of the second lavatory, where a pilot may be present. A rear wall of a further monument, such as a galley, adjacent to the monument is usually made of a bullet-proof material, if it forms the delimiting wall to the cockpit. Thus, a continuous protection for the cockpit area including the area of the second lavatory including the cockpit aisle, when the outer door is in the closed position, can be achieved.

It is further to be understood that a bullet-proof material means in this disclosure any structure, layer and/or supplement that hinders an intruder to enter the cockpit and/or blocks or at least hinders a projectile or sharp device from penetrating the wall/structure into the cockpit.

In a further implementation variant, the outer door can be pivotally mounted to the fifth boundary wall, so that the outer door pivotally moves through a space of the cockpit aisle between the open and closed position. For instance, the outer door can be hinged to the fifth boundary wall or an associated structure at a corner or edge of the fifth boundary wall facing the cockpit aisle. Likewise, the outer door can be pivotally mounted to the third boundary wall or any other associated structure of the second lavatory, such as the first separating wall.

In yet a further implementation variant, the outer door can be configured to pivotally move from the closed position into a space of the cabin area in an emergency situation. In other words, when the outer door is in the closed position, the space of the second lavatory and the cockpit aisle can be accessed from the cockpit. In case of an emergency, if the pilots want to escape from the cockpit area, the pilots have to pivot the outer door towards the open position, i.e., against their escape path from the cockpit through the cockpit aisle into the cabin area. Thus, in an emergency situation, the outer door may advantageously pivot in the opposite direction. For instance, a hinge mechanism can have a breakable stop that hinders the outer door from entering the cabin area, i.e., when being in the closed position. When applying a strong force, the breakable stop can break and allows movement of the outer door away from the cockpit aisle. Of course, any other mechanism can be implemented to allow holding the outer door in the closed position as well as allowing the outer door to open into the cabin area in case of an emergency.

According to a second aspect to better understand the present disclosure, an aircraft comprises an aircraft section according to the first aspect or one of its implementation variants, alternatives or additions.

The present disclosure is not restricted to the aspects and variants in the described form and order. Specifically, the description of aspects and variants is not to be understood as a specifically limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
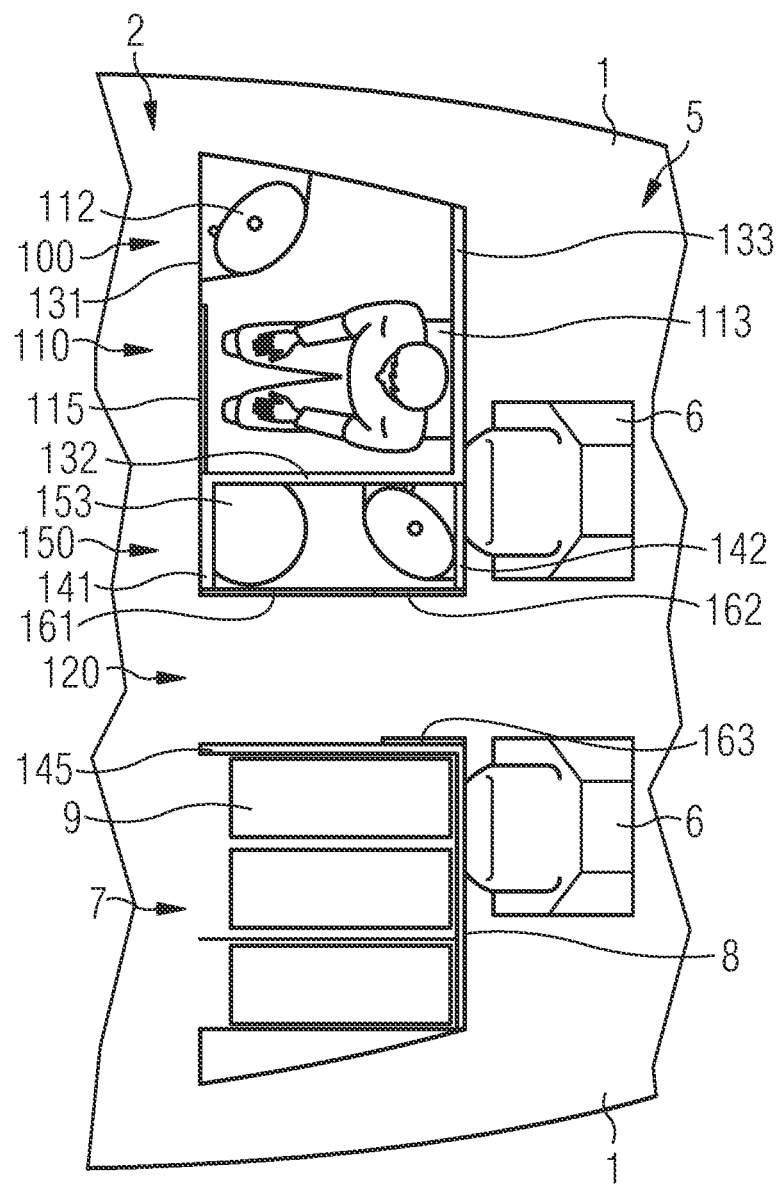
FIG. 1 schematically illustrates an aircraft section having a monument in a first configuration.
Figure 2:
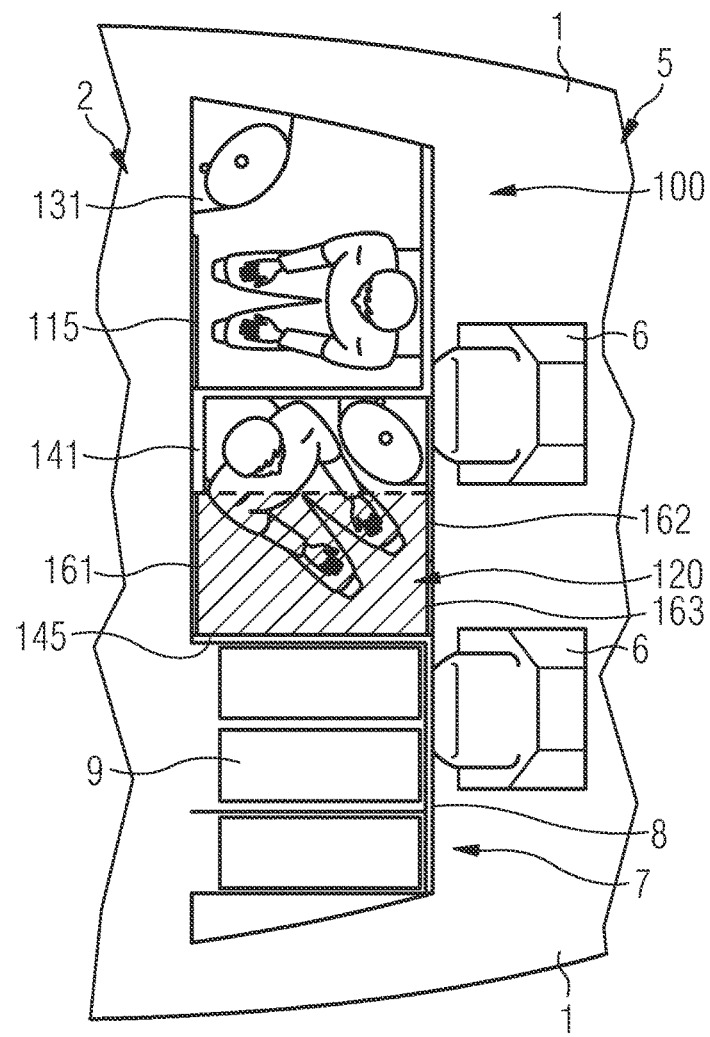
FIG. 2 schematically illustrates the aircraft section of FIG. 1 having the monument in a second configuration.
Figure 12:
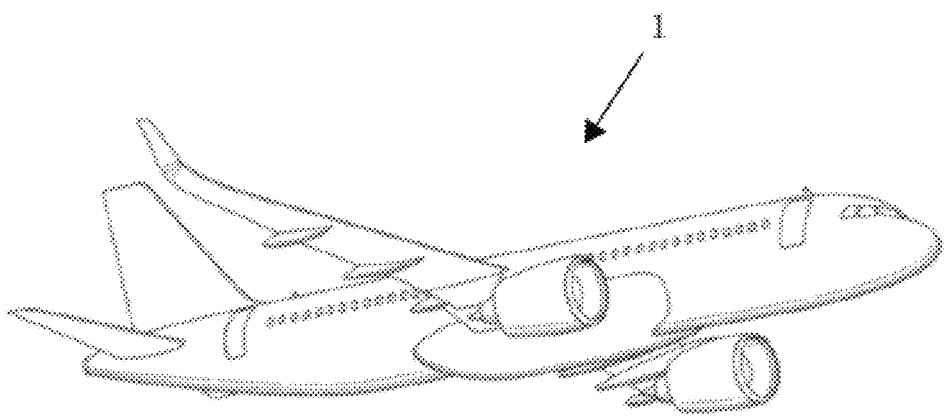

FIG. 1 schematically illustrates an aircraft section 100 having a monument in a first configuration, and FIG. 2 schematically illustrates the aircraft section 100 with the monument being in a second configuration. The aircraft section 100 can be arranged in an aircraft 1 (schematically illustrated only by the outer skin of the aircraft 1 in FIG. 1, but see FIG. 12) close to or adjacent to a cockpit 5 as well as a cabin area 2. The cabin area 2 is an area for passengers, while the cockpit 5 is usually only accessible for pilots. In order to enter or leave the cockpit 5, particularly the pilot seats 6, the aircraft section 100 comprises a cockpit aisle 120, which for example can extend from the cabin area 2 to a rear end of the cockpit 5 and cockpit seats 6.

The monument includes a first lavatory 110 and a second lavatory 150, that are arranged adjacent to one another, particularly in the transverse direction (Y-axis) of the aircraft 1. The second lavatory 150 comprises the cockpit aisle 120. According to the example illustrated in FIGS. 1 and 2, on the opposite side of the cockpit aisle 120 (downwards in FIGS. 1 and 2), a further monument 7 can be arranged, which in FIGS. 1 and 2 is illustrated as a galley holding three trolleys 9. The cockpit aisle 120 is, hence, delimited on both (opposite) sides by the second lavatory 150 and the further monument 7.

The monument of the aircraft section 100 may further include a first separation wall 132 separating the first and second lavatories 110, 150. Each of the lavatories 110, 150 can include at least a sink 112, 152 and a toilet 113, 153 (FIG. 7), as it is illustrated in the drawings. It is to be understood that additional items, (fixed) installations and devices can be provided in one or both of the lavatories 110, 150.

As is derivable from the drawings, the space of the second lavatory 150 holding the items, installations and devices is smaller than the first lavatory 110. Particularly, a floor space occupied by this space of the second lavatory 150 is smaller than a floor space of the first lavatory 110. The remaining area of the second lavatory 150 is kept free to form the cockpit aisle 120.

The space of the first lavatory 110 can be accessed via a lavatory door 115. Particularly, the lavatory door 115 allows access from the cabin area 2 into the first lavatory 110, and can exemplarily be opened into the cabin area 2 or into the space of the first lavatory 110.

The monument further comprises a first boundary wall 133 delimiting the first lavatory 110 and a first portion of a rear wall of the cockpit 5, and a second boundary wall 142 delimiting the second lavatory 150 and a second portion of the rear wall of the cockpit 5. While the first and second boundary walls 133, 142 are illustrated as forming a continuous rear wall of the cockpit 5, a step between both walls 133, 142 may be present, for example, at the first separation wall 132. The step may extent in the same direction as the first separation wall 132, e.g., the longitudinal axis (X-axis) of the aircraft 1.

The monument further includes an outer door 161 movable between an open position as illustrated in the configuration of FIG. 1 and a closed position as illustrated in the configuration of FIG. 2. In the open position of the outer door 161, the cockpit aisle 120 is accessible from the cabin area 2, while the cockpit aisle 120 is blocked with respect to the cabin area 2, when the outer door 161 is in the closed position. Thus, in the second configuration illustrated in FIG. 2, the cockpit aisle 120 is only accessible from the cockpit 5. For instance, the outer door 161 may be locked in the closed position, which may be performed by a pilot after entering the cockpit 5.

On the side of the further monument 7, the monument may include a third boundary wall 145 delimiting the second lavatory 150 including the cockpit aisle 120 and a remainder of the aircraft section 100. In other words, the third boundary wall 145 may form part of the monument including the first and second lavatories 110, 150, so that the cockpit aisle 120 can be installed together with the lavatories 110, 150.

Furthermore, the monument can include a fifth boundary wall 141 delimiting the second lavatory 150 and the cabin area 2. The fifth boundary wall 141 may end at the cockpit aisle 120, i.e., forming an entry into the cockpit aisle 120 (particularly together with the third boundary wall 145).

The fifth boundary wall 141 may be used to pivotally mount the outer door 161 thereto. Thus, when the outer door 161 is in the open position, the outer door 161 can be substantially flush with the outer edge or free end of the fifth boundary wall 141. In this configuration (cf. FIG. 1), the outer door 161 allows not only access into the cockpit aisle 120, but further covers or hides the interior space of the second lavatory 150 holding any fixed installation(s). In the second configuration (cf. FIG. 2), where the outer door 161 is in the closed position, the outer door 161 may be locked at the further monument 7 and/or the third boundary wall 145 (particularly, an edge or free end of the third boundary wall 145 facing the cabin area 2). It is to be understood, that the outer door 161 can likewise be pivotally mounted to the third boundary wall 145, i.e., on a side opposite to the one illustrated in FIGS. 1 and 2.

The monument can further include at least one inner door 162, 163, each of which can be movable between an open position (cf. FIG. 1), where the cockpit aisle 120 is accessible from the cockpit, and a closed position (cf. FIG. 2), where the cockpit aisle 120 is blocked with respect to the cockpit 5. The second configuration as illustrated in FIG. 2 allows a pilot to use the second lavatory 150 and having privacy, particularly if the outer door 161 is also in the closed position.

Since the width of a door leaf of the outer door 161 is defined by the width W2 of the cockpit aisle 120 (cf. FIG. 8), the outer door 161 may not necessarily cover or hide the entire second lavatory 150 (when viewing along the longitudinal direction of the aircraft 1), but leave an open gap towards the cockpit 5. In order to cover this gap, the at least one inner door 162, 163 may be used. FIGS. 1 and 2 illustrate two inner doors 162 and 163, wherein a first inner door 162 closes the gap at the second lavatory 150 left open by the outer door 161, when the outer door 161 is in the open position.

As a mere example, the first inner door 162 can be mounted to the second lavatory 150, for example it can be hinged to a structure or wall forming/delimiting the second lavatory 150. The width of a door leaf of the first inner door 162 can be designed to close the entire gap left open by the outer door 161. In addition, the first inner door 162 can be configured to be latched or connected to the outer door 161, when both doors 161, 162 are in the open position. This allows securely coupling the outer door 161 and the first inner door 162 and leaving the cockpit aisle 120 accessible from the cabin area 2 and the cockpit 5.

The second inner door 163 can either be coupled to the first inner door 162 or, as illustrated in FIGS. 1 and 2, to the further monument 7 and/or the third boundary wall 145.

It is to be understood that, although all doors 161 to 163 are illustrated as hinged doors, one or more of these doors 161 to 163 can be implemented as a sliding door or a folding door. It is likewise possible to use a curtain instead of one or more of the inner doors 162, 163.

As can be derived from a comparison of FIGS. 1 and 2, the cockpit aisle 120 is freely accessible in the open configuration, according to FIG. 1, and forms part of the lavatory area (footprint) of the second lavatory 150, when in the closed configuration, according to FIG. 2. Thus, the floor plan area (footprint) of the cockpit aisle 120 (hatched area in FIG. 2) can be employed as additional space for the second lavatory 150. In the open configuration, the second lavatory 150 may not be used as such, due to the limited space and/or the opened doors 161, 162. Thus, an efficient use of space in the aircraft section 100 between cabin area 2 and cockpit 5 is provided, while a second lavatory 150 can be installed for dedicated use by the pilots. It is to be understood, that opening the first inner door 162 (or omitting this door 162) may allow using the sink 152 arranged next to this inner door 162, even if the outer door 161 is in the open position.

Figure 3:
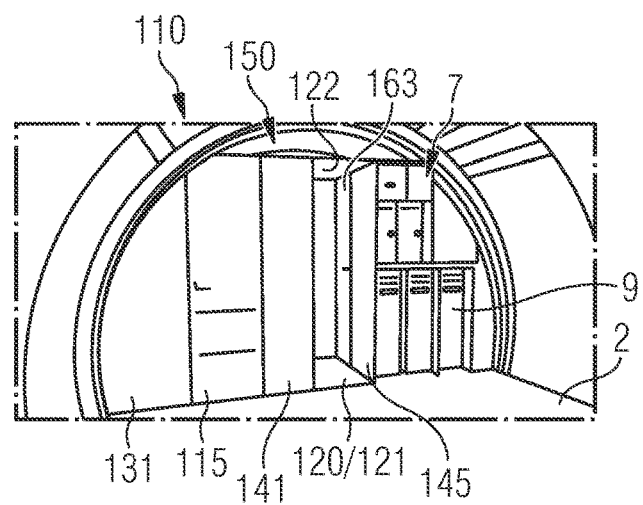
FIG. 3 schematically illustrates an aircraft section with an outer door in an open position.
Figure 4:
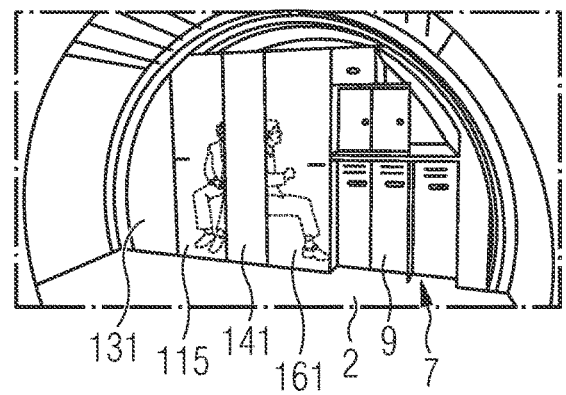
FIG. 4 schematically illustrates the aircraft section of FIG. 3 with the outer door in a closed position.

Turning to FIGS. 3 and 4, a perspective view of the aircraft section 100 is illustrated (when viewing from the cabin area 2 towards the cockpit 5). In FIG. 3, the outer door 161 is in the open position, and the cockpit aisle 120 is accessible from the cabin area 2. The at least one inner door 162, 163 is also in the open position, so that the cockpit 5 is accessible from the cockpit aisle 120, and hence the cockpit 5 is completely accessible from the cabin area 2. This configuration may be employed while no pilot is present in the cockpit 5 and/or during turnover times at an airport.

In FIG. 4, the outer door 161 is in the closed position, so that the cockpit aisle 120 is blocked with respect to the cabin area 2. In this configuration, the second lavatory 150 can be used only by a pilot, and can particularly be employed during flight time of the aircraft. For better illustration of the configurations, the lavatory door 115 into the first lavatory 110 and the outer door 161 are illustrated semi-transparent. As can be derived from FIG. 4, the first and second lavatories 110, 150 can be used by a respective person at the same time, while being separated by the first separation wall 132.

In FIG. 3, the monument is illustrated as further comprising a cockpit aisle floor 121 forming a bottom of the cockpit aisle 120 and being connected to a structure of the second lavatory 150. Furthermore, FIG. 3 illustrates a cockpit aisle ceiling 122 covering the cockpit aisle 120 and being connected to a structure of the second lavatory 150. Specifically, the cockpit aisle 120, particularly its delimiting wall(s), floor and ceiling, is integrated into the monument, so that it can be installed into the aircraft together with the monument. It is to be understood that at least one of the third boundary wall 145, the cockpit aisle floor 121 and the cockpit aisle ceiling 122 can be optional. If at least one of the cockpit aisle floor 121 and the cockpit aisle ceiling 122 is present, the third boundary wall 145 can be easily mounted to the monument, while the cockpit aisle floor and/or ceiling 121, 122 are connected to a structure forming the remainder of the second lavatory 150. In other words, at least two of these elements 121, 122 and 145 form part of a tunnel forming the cockpit aisle 120.

Furthermore, the further monument 7 is illustrated in each of FIGS. 3 and 4 as an aircraft galley. The galley may hold a plurality of trolleys 9 as well as further galley devices, such as ovens, fridges, coffeemaker, etc. Thus, the aircraft section 100 can be used as in a usual aircraft. In addition thereto, a dedicated pilot lavatory 150 is provided.

Figure 5:
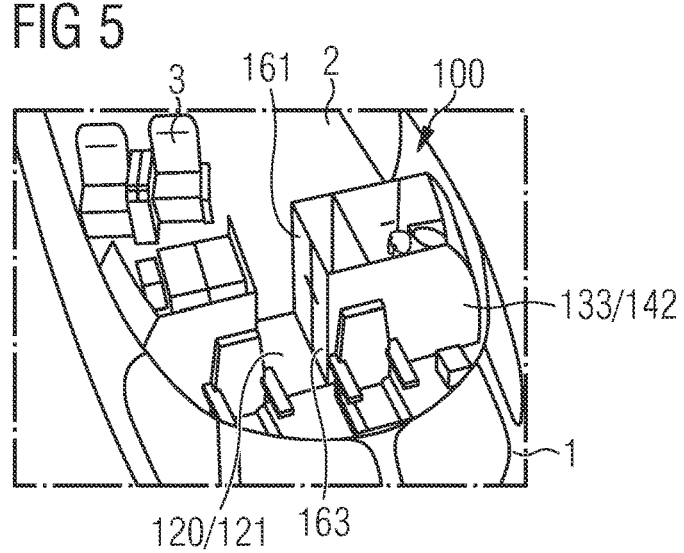
FIG. 5 schematically illustrates a perspective view of a cockpit area, a cabin area and an aircraft section having a monument in a first configuration.
Figure 6:
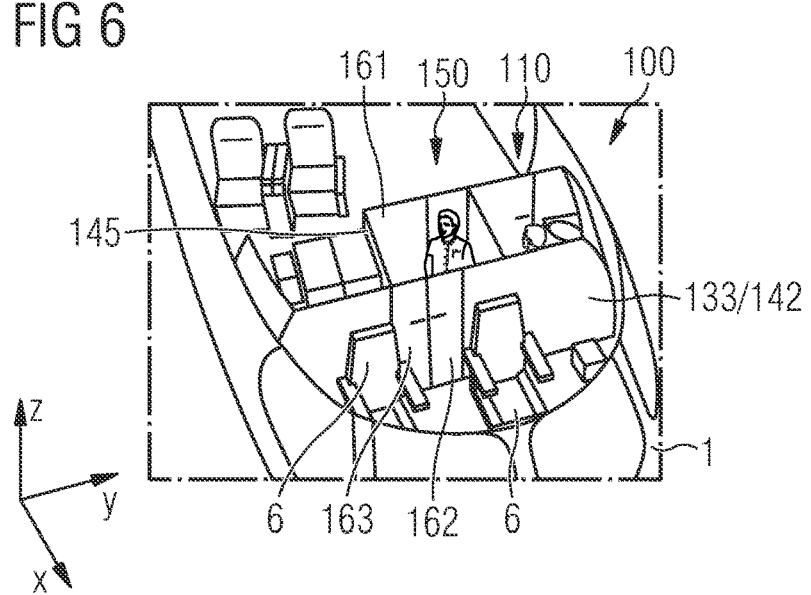
FIG. 6 schematically illustrates a perspective view of the cockpit area, the cabin area and the aircraft section of FIG. 5 with the monument being in a second configuration.

FIGS. 5 and 6 respectively illustrate a perspective view of the cockpit area 5, the cabin area 2 and an aircraft section 100 as in FIGS. 3 and 4, respectively, but from a different viewing angle looking from the nose of the aircraft 1 over the cockpit 5, and the aircraft section 100 towards the cabin area 2. In FIG. 5 the aircraft section 100 has the monument in the first configuration, where the cockpit aisle 120 is accessible from the cabin area 2 as well as the cockpit 5. In FIG. 6 the aircraft section 100 has the monument in the second configuration, where the cockpit aisle 120 is blocked by the outer door 161 with respect to the cabin area 2 and the second lavatory 150 (including the area of the cockpit aisle 120) is blocked by the at least one inner door 162, 163 with respect to the cockpit 5.

In FIGS. 5 and 6 passenger seats 3 are illustrated in the cabin area 2. It is to be noted that FIGS. 5 and 6 illustrate the cabin area 2 with the first row of passenger seats 3 on the left being omitted (on the right-hand side in these drawings). This is for illustrative purposes only. For instance, in common aircraft configurations, this space of the cabin area 2 may be occupied by a second lavatory (not illustrated) if the first lavatory 110 is for dedicated pilot use as explained above. As can be derived from these drawings, instead of installing a second lavatory, the first row of passenger seats 3 can also be installed on the left-hand side of the aircraft 1, while a second lavatory 150 dedicated for the pilots is also provided.

Figure 7:
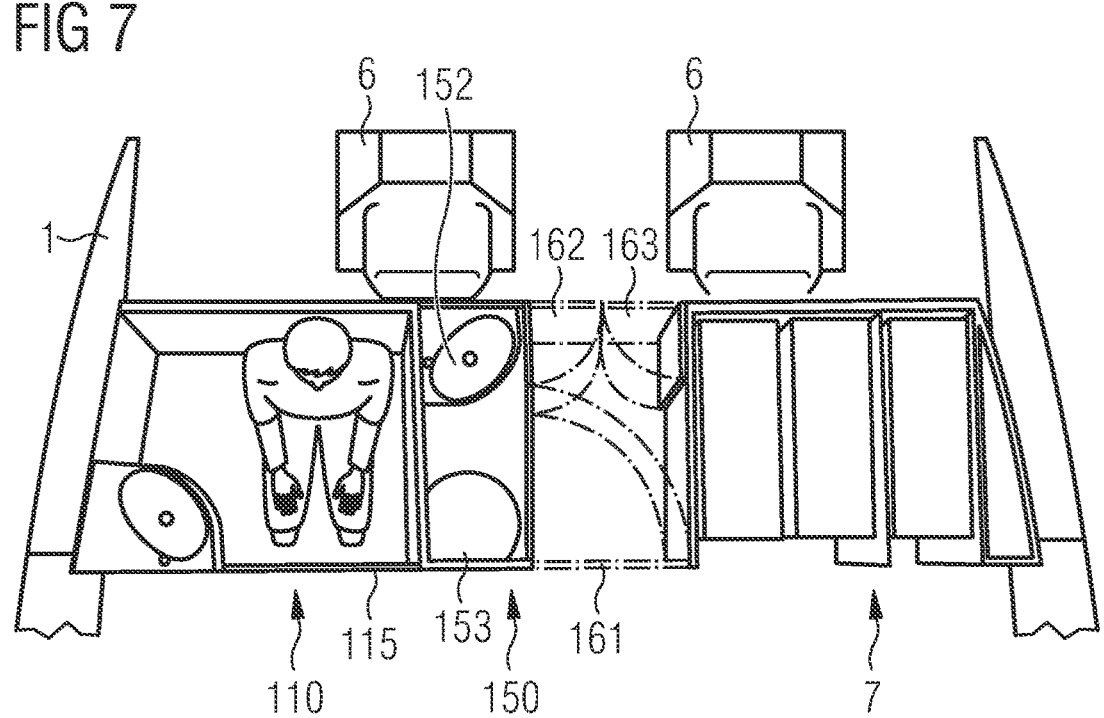
FIG. 7 schematically illustrates a top view of an aircraft section.

FIG. 7 schematically illustrates a top view of an aircraft section 100. The movement of the outer door 161 as well as the at least one inner door 162, 163 are illustrated as dash dotted lines. Each of the door's movement is illustrated as a rotating movement. Such hinged connection of each door 161 to 163 provides for a simple installation of the doors. It is to be understood, however, that at least one of these doors may be a sliding door or may perform a different movement or combinations thereof.

Furthermore, the outer door 161 and a first inner door 162 can cooperate, for example, by being configured to be coupled to one another when both doors 161, 162 are in the open position. Likewise, the first inner door 162 and second inner door 163 can cooperate, for example, by being configured to be coupled to one another when both doors 162, 163 are in the closed position. When in the open position, the second inner door 163 may be configured to be latched or connected to the third boundary wall 145 and/or a structure or wall of the further monument 7, so that the second inner door 163 can be securely kept in the open position.

The doors 161 to 163 can further be configured to be movable only in areas above the floor plan area (footprint) of the cockpit aisle 120 (as illustrated in FIG. 7). The outer door 161 may additionally be configured to move into the cabin area 2, such movement is not illustrated in FIG. 7. For instance, in case of an emergency, a pilot leaving the cockpit 5 may push the outer door 161 into the cabin area 2 (downwards in FIG. 7) instead of opening the outer door 161 towards the cockpit 5, i.e., against the evacuation path. Such movement of the outer door 161 into the cabin area 2 may be hindered by a corresponding mechanism (not illustrated), which may be released by an associated mechanism (also not illustrated) or by a strong force.

Figure 8:
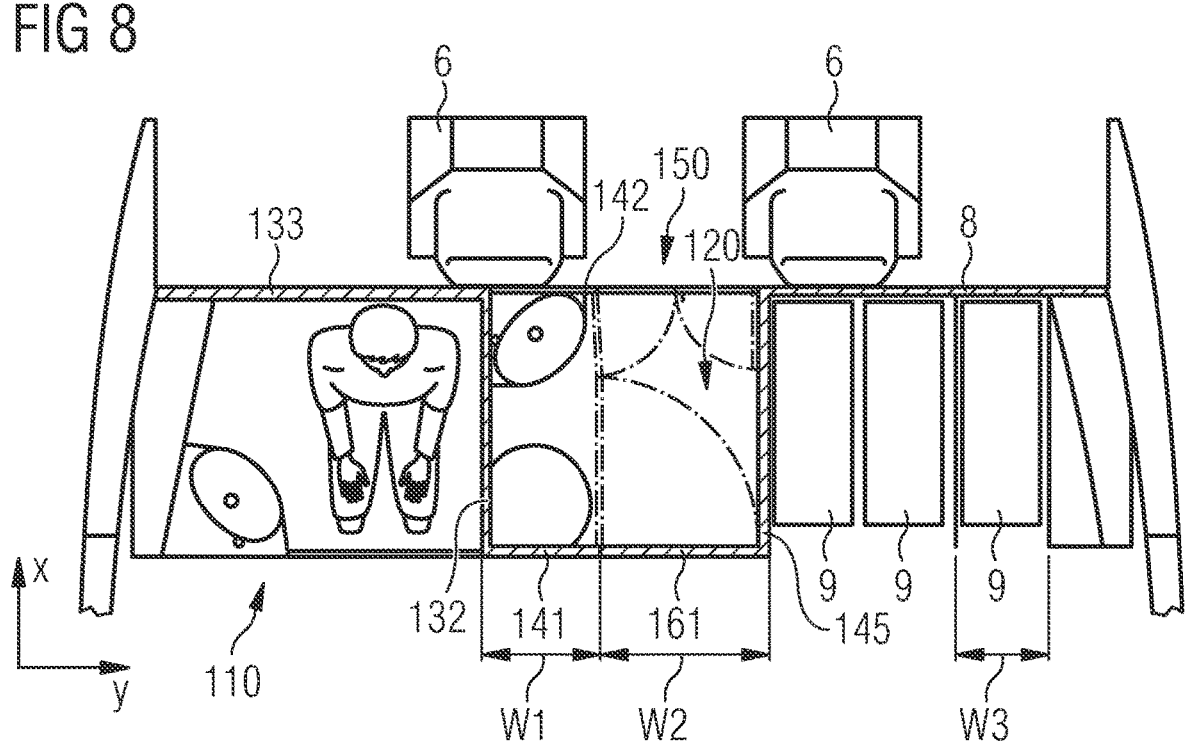
FIG. 8 schematically illustrates another top view of an aircraft section.

FIG. 8 schematically illustrates a top view of an aircraft section 100 and highlights a protection for the cockpit 5 (cf. patterned walls or wall sections in FIG. 8). Specifically, the first boundary wall 133, the first separation wall 132, the fifth boundary wall 141, the outer door 161 and the third boundary wall 145 are made of a bullet-proof material and/or are configured to withstand intruders, sharp objects and/or projectiles. Thus, the monument provides for protection of the pilots and the cockpit including the space of the second lavatory 150 including the cockpit aisle 120. This is particularly relevant, as a pilot can use the space of the second lavatory 150 and cockpit aisle 120, while the outer door 161 is in the closed position.

The remainder of a rear wall of the cockpit 5 is formed by a back wall 8 of the further monument 7. Such back walls 8 are commonly made of a bullet-proof material and/or made in such a manner that the cockpit area 5 is protected. It is to be understood that this protection can be continuous or includes protective joints, for example, between the outer door 161 and the fifth boundary wall 141 and/or the third boundary wall 145, as well as between the third boundary wall 145 and the back wall 8.

Furthermore, the further monument 7 is illustrated in FIG. 8 as a galley comprising storage space for a plurality of trolleys 9. As such trolleys 9 have a standardized width, a parking space for such trolley 9 can also be provided with a standardized width W3. Likewise, the cockpit aisle 120 requires a specific (minimum) width W2, allowing a person to enter or leave the cockpit 5, particularly in case of an emergency.

In order to have the second lavatory 150 to fit into the monument, the width of the first lavatory 110 may be made smaller. Additionally or alternatively, the width W1 of the space of the second lavatory 150 holding any fixed installation(s), particularly when the outer door 161 is in the open position, can be equal to or smaller than the standardized width W3 of a trolley parking space. In this case, the galley 7 may be designed to only omit one parking space for a trolley 9, but allows installation of a second lavatory 150 employing the footprint space of the cockpit aisle 120. Such restriction to the galley may easily be accepted for the benefit of a pilot dedicated second lavatory 150.

Figure 9:
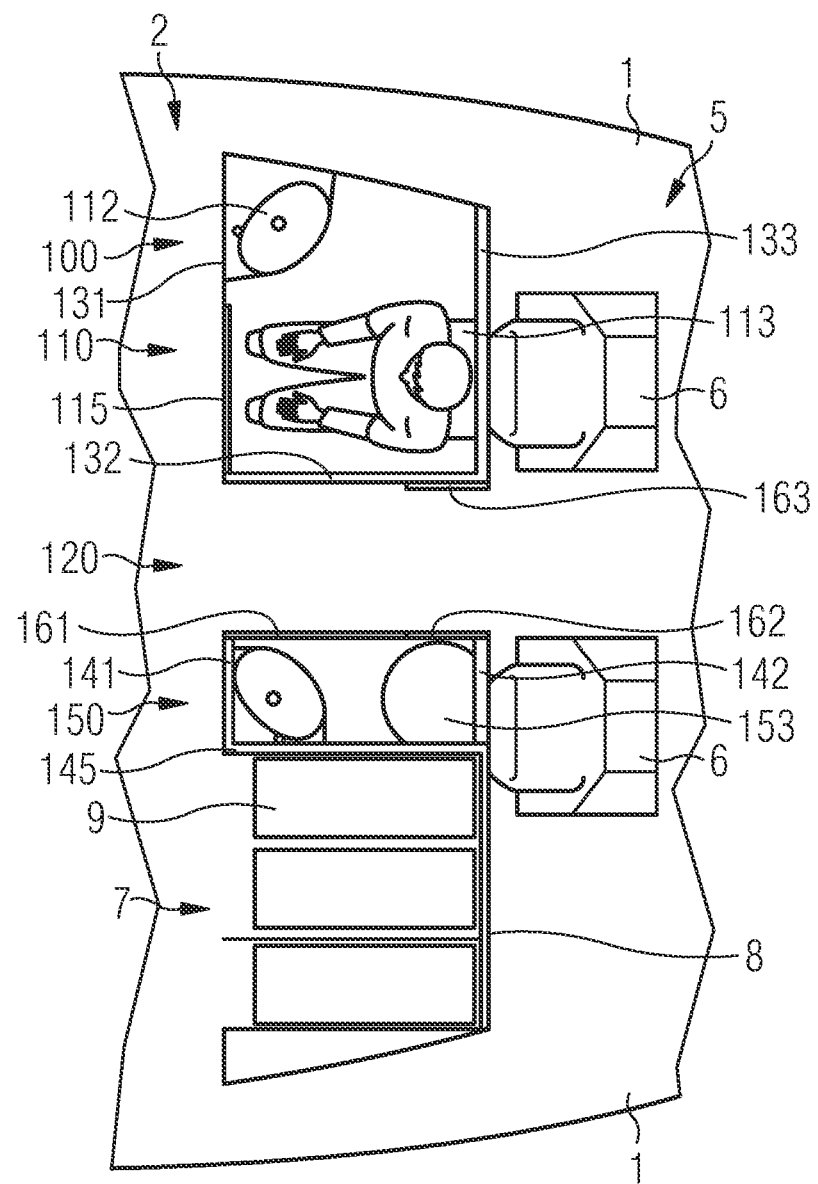
FIG. 9 schematically illustrates another exemplary aircraft section having a monument similar to the type illustrated in FIG. 1.
Figure 10:
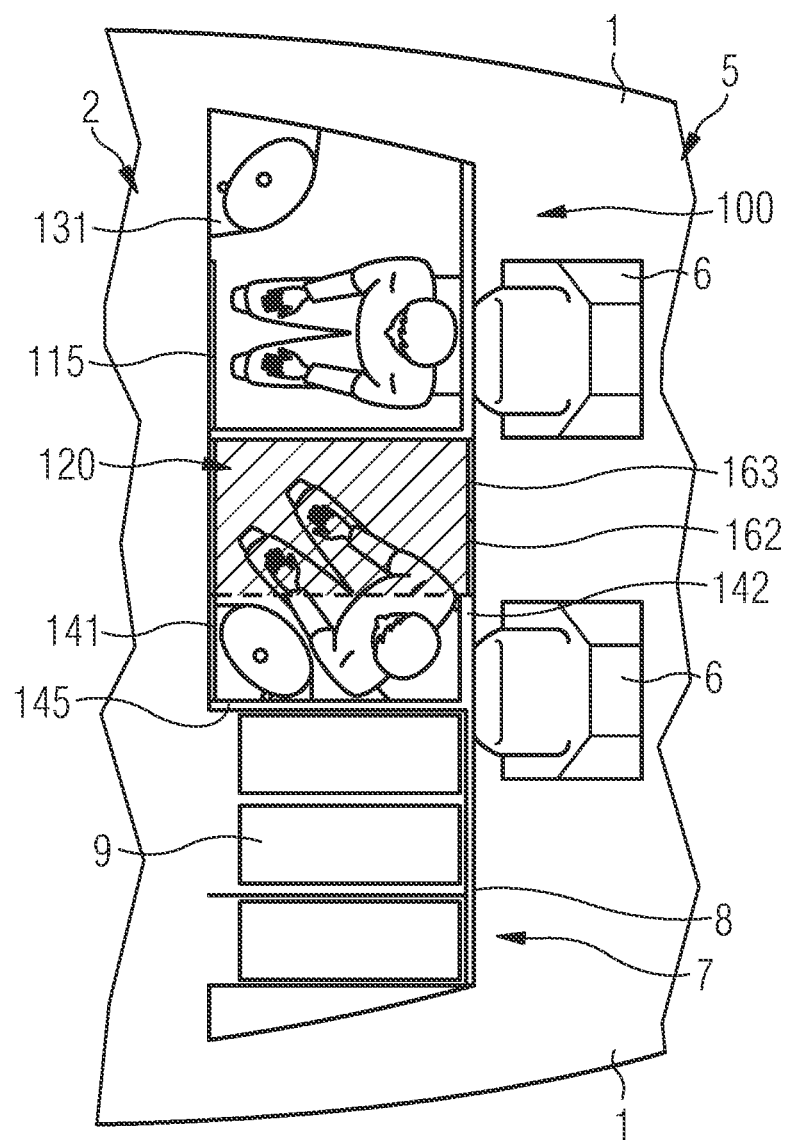
FIG. 10 schematically illustrates the aircraft section of FIG. 9 in a different configuration.

FIGS. 9 and 10 illustrates a further exemplary aircraft section 100, that is quite similar to the one illustrated in FIGS. 1 and 2. The same or similar structures and components are provided with the same reference numerals. For sake of brevity, the description of such structures and components is omitted.

The main difference between the exemplary aircraft sections 100 of FIGS. 9 and 10 over the one illustrated in FIGS. 1 and 2 is the arrangement of the cockpit aisle 120 and the space of the second lavatory 150 holding any fixed installation(s), such as toilet bowl 153, sink 152, etc. In FIGS. 9 and 10 the cockpit aisle 120 is arranged adjacent to the first lavatory 110 (in the transverse direction). Further adjacent to the cockpit aisle 120 in the transverse direction is the space of the second lavatory 150 holding any fixed installation(s). This allows connecting any supply or exhaust lines for the second lavatory 150 to the galley 7, which is usually equipped with such lines (e.g., water, electricity, waste water, exhaust air, etc.).

Thus, the first separation wall 132 separates the first lavatory 110 from the second lavatory 150, but (compared to FIGS. 1 and 2) delimits one side of the cockpit aisle 120. In other words, the first separation wall 132 can form a side wall of the cockpit aisle 120.

Furthermore, the second inner door 163 can be pivotally mounted (hinged) to the first separation wall 132. The first inner door 162 is then pivotally mounted (hinged) to the second boundary wall 142 arranged adjacent to the further monument 7. The outer door 161 is pivotally mounted (hinged) either to the first separation wall 132 or to the fifth boundary wall 141.

Figure 11:
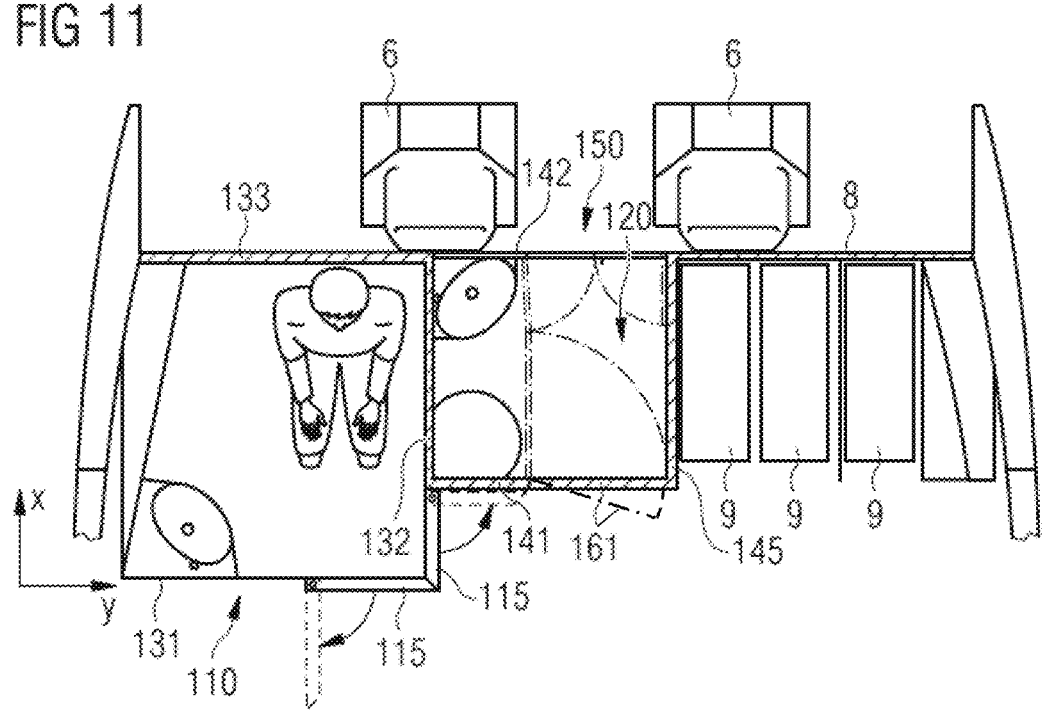
FIG. 11 schematically illustrates another exemplary aircraft section having a monument with a first lavatory of increased footprint; and, FIG. 12 illustrates an aircraft having an aircraft section according to the present invention.

FIG. 11 schematically illustrates another exemplary aircraft section 100 having a monument with a first lavatory 110 of increased footprint. Specifically, the fourth boundary wall 131 delimiting the first lavatory 110 and the cabin area 2 from one another is arranged further away from the cockpit 5 (when viewing along the longitudinal direction) than the fifth boundary wall 141 (delimiting the second lavatory 150 and the cabin area 2 and the outer door 161 in the closed position). Such first lavatory 110 of increased (footprint) area allows provision of a lavatory for people with reduced mobility and/or for higher cabin classes (such as business or first class).

Furthermore, as illustrated in FIG. 11, in order to increase the doorway to access the first lavatory 110, the step provided between the fourth boundary wall 131 and the fifth boundary wall 141 can be used to install a door closing the corner between fourth and fifth boundary walls 131, 141. This can be achieved by a single door, a foldable door or by a double door 115 (as illustrated in FIG. 11). In any case, the larger doorway also facilitates entry into the first lavatory 110, particularly for people with reduced mobility, such as allowing people having a walking aid or an on-board-wheelchair to easily pass through the door.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft section arranged between a cockpit and a cabin area of an aircraft, the aircraft section comprising:
   a cockpit aisle configured to allow access to the cockpit from the cabin area; and
   a monument extending in a longitudinal direction and a transverse direction of the aircraft, and including:
      a first lavatory;
      a second lavatory arranged adjacent to the first lavatory in the transverse direction and comprising the cockpit aisle;
      a first separation wall separating the first lavatory from the second lavatory;
      a first boundary wall delimiting the first lavatory and a first portion of a rear of the cockpit;
      a second boundary wall delimiting the second lavatory and a second portion of a rear of the cockpit, the second boundary wall being at least one of parallel to the first boundary wall and forming a continuous wall with the first boundary wall; and
      an outer door movable between an open position, where the cockpit aisle is accessible from the cabin area, and a closed position, where the cockpit aisle is blocked with respect to the cabin area; and
      a third boundary wall delimiting a galley of the aircraft arranged adjacent to the second lavatory in the transverse direction.

2. The aircraft section of claim 1, wherein the outer door is mounted to the second lavatory and is configured to separate at least one fixed installation of the second lavatory from the cockpit aisle, when the outer door is in the open position.

3. The aircraft section of claim 1, wherein the monument further includes:
   at least one inner door movable between an open position, where the cockpit aisle is accessible from the cockpit, and a closed position, where the cockpit aisle is blocked with respect to the cockpit.

4. The aircraft section of claim 3, wherein the at least one inner door is mounted to the second lavatory and is configured to separate at least one fixed installation of the second lavatory from the cockpit aisle, when the at least one inner door is in the open position.

5. The aircraft section of claim 3, wherein the at least one inner door comprises a first inner door mounted to the second lavatory and configured to separate at least one fixed installation of the second lavatory from the cockpit aisle, when the first inner door is in the open position, and a second inner door mounted at a position opposite to the first inner door with respect to the cockpit aisle.

6. The aircraft section of claim 5, wherein the second inner door is mounted to a wall delimiting a further monument arranged adjacent to the second lavatory in the transverse direction, or
   wherein the second inner door is mounted to the first boundary wall.

7. The aircraft section of claim 1, wherein the monument further includes at least one of:
   a cockpit aisle floor forming a bottom of the cockpit aisle, and
   a cockpit aisle ceiling covering the cockpit aisle.

8. The aircraft section of claim 1, wherein a space of the second lavatory holding at least one fixed installation of the second lavatory, when viewed in the longitudinal direction of the aircraft and when the outer door is in the open position, has a width substantially corresponding to a width of a trolley parking space.

9. The aircraft section of claim 1, wherein the monument further comprises:
   a lavatory door configured to allow access from the cabin area into the first lavatory.

10. The aircraft section of claim 9, wherein the lavatory door is installed in a fourth boundary wall delimiting the first lavatory and the cabin area, and wherein the fourth boundary wall is spaced apart in the longitudinal direction from the outer door in the closed position.

11. The aircraft section of claim 1, wherein at least the first separation wall, the first boundary wall, and the outer door are made of a bullet-proof material.

12. The aircraft section of claim 1, wherein the monument further includes:
   a fifth boundary wall delimiting the second lavatory and the cabin area.

13. The aircraft section of claim 12, wherein the fifth boundary wall is made of a bullet-proof material.

14. The aircraft section of claim 12, wherein the outer door is pivotally mounted to the fifth boundary wall, so that the outer door pivotally moves through a space of the cockpit aisle between the open and closed positions.

15. The aircraft section of claim 14, wherein the outer door is configured to pivotally move from the closed position into a space of the cabin area in an emergency situation.

16. An aircraft comprising:
an aircraft section arranged between a cockpit and a cabin area of the aircraft, the aircraft section comprising:
a cockpit aisle configured to allow access to the cockpit from the cabin area; and
a monument extending in a longitudinal direction and a transverse direction of the aircraft, and including:
a first lavatory positioned on a first side of the cockpit aisle;
a second lavatory positioned on the first side of the cockpit aisle and arranged adjacent to the first lavatory in the transverse direction;
a first separation wall separating the first lavatory from the second lavatory;
a first boundary wall delimiting the first lavatory and a first portion of a rear of the cockpit;
a second boundary wall delimiting the second lavatory and a second portion of a rear of the cockpit, the second boundary wall being at least one of parallel to the first boundary wall and forming a continuous wall with the first boundary wall; and
an outer door movable between an open position, where the cockpit aisle is accessible from the cabin area, and a closed position, where the cockpit aisle is blocked with respect to the cabin area.

17. The aircraft of claim 16, wherein the outer door is mounted to the second lavatory and is configured to separate at least one fixed installation of the second lavatory from the cockpit aisle, when the outer door is in the open position.

18. The aircraft of claim 16, wherein the second lavatory encompasses the cockpit aisle when the outer door is in the closed position.

19. An aircraft section arranged between a cockpit and a cabin area of an aircraft, the aircraft section comprising:
a cockpit aisle configured to allow access to the cockpit from the cabin area; and
a monument extending in a longitudinal direction and a transverse direction of the aircraft, and including:
a first lavatory;
a second lavatory arranged adjacent to the first lavatory in the transverse direction and comprising the cockpit aisle;
a first separation wall separating the first lavatory from the second lavatory;
a first boundary wall delimiting the first lavatory and a first portion of a rear of the cockpit;
a second boundary wall delimiting the second lavatory and a second portion of a rear of the cockpit, the second boundary wall being at least one of parallel to the first boundary wall and forming a continuous wall with the first boundary wall; and
an outer door movable between an open position, where the cockpit aisle is accessible from the cabin area, and a closed position, where the cockpit aisle is blocked with respect to the cabin area; and
at least one inner door movable between an open position, where the cockpit aisle is accessible from the cockpit, and a closed position, where the cockpit aisle is blocked with respect to the cockpit, the at least one inner door comprising a first inner door mounted to the second lavatory and configured to separate at least one fixed installation of the second lavatory from the cockpit aisle, when the first inner door is in the open position, and a second inner door mounted at a position opposite to the first inner door with respect to the cockpit aisle.

* * * * *